(12) United States Patent
Iwamaru et al.

(10) Patent No.: US 12,384,461 B2
(45) Date of Patent: Aug. 12, 2025

(54) ASSISTANCE DEVICE AND STRADDLE TYPE VEHICLE

(71) Applicant: HONDA MOTOR CO., LTD., Tokyo (JP)

(72) Inventors: Toraki Iwamaru, Tokyo (JP); Ryo Takechi, Tokyo (JP); Ko Hosokawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 153 days.

(21) Appl. No.: 18/235,784

(22) Filed: Aug. 18, 2023

(65) Prior Publication Data

US 2023/0391402 A1 Dec. 7, 2023

Related U.S. Application Data

(63) Continuation of application No. PCT/JP2021/048080, filed on Dec. 24, 2021.

(30) Foreign Application Priority Data

Mar. 9, 2021 (JP) ................................ 2021-037619

(51) Int. Cl.
*B62D 15/02* (2006.01)
*B60W 40/076* (2012.01)
(Continued)

(52) U.S. Cl.
CPC ......... *B62D 15/028* (2013.01); *B60W 40/076* (2013.01); *B60W 40/08* (2013.01);
(Continued)

(58) Field of Classification Search
CPC . B62D 15/028; B62D 15/021; B60W 40/076; B60W 40/08; B60W 50/14;
(Continued)

(56) References Cited

U.S. PATENT DOCUMENTS

| | | | |
|---|---|---|---|
| 7,445,235 B2 | 11/2008 | Makabe et al. | |
| 8,340,870 B2 | 12/2012 | Ohshima et al. | |
| 10,913,496 B2* | 2/2021 | Yamashita | ......... B62D 15/0285 |
| 2007/0075533 A1 | 4/2007 | Makabe et al. | |

(Continued)

FOREIGN PATENT DOCUMENTS

| | | | |
|---|---|---|---|
| JP | 2007091181 A | 4/2007 | |
| JP | 2010058763 A | 3/2010 | |

(Continued)

OTHER PUBLICATIONS

International Search Report for PCT/JP2021/048080 mailed Feb. 15, 2022 with partial English Translation.

*Primary Examiner* — Quan Zhen Wang
*Assistant Examiner* — Rajsheed O Black-Childress
(74) *Attorney, Agent, or Firm* — Thomas Horstemeyer, LLP

(57) ABSTRACT

The present invention can realize a relatively simple parking operation of a straddle type vehicle. The present invention is related to an assistance device that assists an operation of a straddle type vehicle, the assistance device comprising acquisition means for acquiring steering angle information indicating a steering angle of the straddle type vehicle and inclination angle information indicating an inclination of a vehicle body of the straddle type vehicle, calculation means for calculating a trajectory of the straddle type vehicle, in a case of performing handling the straddle type vehicle, based on the steering angle information and the inclination angle information, and output means for outputting information indicating the trajectory.

11 Claims, 9 Drawing Sheets

(51) Int. Cl.
  *B60W 40/08* (2012.01)
  *B60W 50/14* (2020.01)
  *B62J 45/415* (2020.01)

(52) U.S. Cl.
  CPC ........... *B60W 50/14* (2013.01); *B62D 15/021* (2013.01); *B62J 45/4151* (2020.02); *B60W 2050/143* (2013.01); *B60W 2050/146* (2013.01); *B60W 2300/36* (2013.01); *B60W 2540/18* (2013.01); *B60W 2552/15* (2020.02)

(58) Field of Classification Search
  CPC ..... B60W 2050/143; B60W 2050/146; B60W 2300/36; B60W 2540/18; B60W 2552/15; B60W 30/06; B62J 45/4151; B62J 3/10; B62J 27/00; B62J 45/20; B62J 45/41; B62J 50/22
  See application file for complete search history.

(56) References Cited

U.S. PATENT DOCUMENTS

| | | | |
|---|---|---|---|
| 2010/0070139 | A1 | 3/2010 | Ohshima et al. |
| 2015/0183319 | A1* | 7/2015 | Oh .......................... B62K 5/08 180/242 |
| 2017/0192433 | A1* | 7/2017 | Kuttenberger ....... B62J 45/4151 |
| 2019/0147746 | A1* | 5/2019 | Wernicke ............... G08G 1/205 340/436 |
| 2019/0210592 | A1* | 7/2019 | Wahl ................... B60W 30/045 |
| 2020/0307616 | A1* | 10/2020 | Nithiyanantham .......................... G02B 27/0093 |

FOREIGN PATENT DOCUMENTS

| | | | |
|---|---|---|---|
| JP | 2010069942 A | | 4/2010 |
| KR | 20120140505 A | * 12/2012 | ............ B60W 40/06 |
| WO | 2022190576 A1 | | 9/2022 |

\* cited by examiner

ASSISTANCE DEVICE AND STRADDLE TYPE VEHICLE

CROSS-REFERENCE TO RELATED APPLICATION(S)

This application is a continuation of International Patent Application No. PCT/JP2021/048080 filed on Dec. 24, 2021, which claims priority to and the benefit of Japanese Patent Application No. 2021-037619 filed on Mar. 9, 2021, the entire disclosures of which are incorporated herein by reference.

TECHNICAL FIELD

The present invention mainly relates to an assistance device mountable on a straddle type vehicle.

BACKGROUND ART

Some of vehicles include an assistance device for performing driving assistance, and Patent Literature 1 describes a technique for displaying a guidance display at the time of a parking operation on an on-vehicle display device.

CITATION LIST

Patent Literature

PTL 1: Japanese Patent Laid-Open No. 2010-69942

SUMMARY OF INVENTION

Technical Problem

The parking operation of a straddle type vehicle such as a motorcycle is performed in many cases by pushing and pulling (so-called "handling") a vehicle body by a driver himself/herself in a state where an engine of the vehicle is stopped, and the driving assistance as described above can also be demanded for the straddle type vehicle.

The present invention has an exemplary object to relatively simply enable performing a parking operation of a straddle type vehicle.

Solution to Problem

One aspect of the present invention is related to an assistance device that assists an operation of a straddle type vehicle, the assistance device comprising:
  an acquisition unit configured to acquire steering angle information indicating a steering angle of the straddle type vehicle and inclination angle information indicating an inclination of a vehicle body of the straddle type vehicle;
  a calculation unit configured to calculate a trajectory of the straddle type vehicle, in a case of performing handling the straddle type vehicle, based on the steering angle information and the inclination angle information; and
  an output unit configured to output information indicating the trajectory.

Advantageous Effects of Invention

According to the present invention, it becomes possible to relatively simply perform the parking operation of the straddle type vehicle.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

The accompanying drawings, which are incorporated in and constitute a part of the specification, illustrate embodiments of the invention and, together with the description, serve to explain principles of the invention.

DESCRIPTION OF EMBODIMENTS

Figure 1:
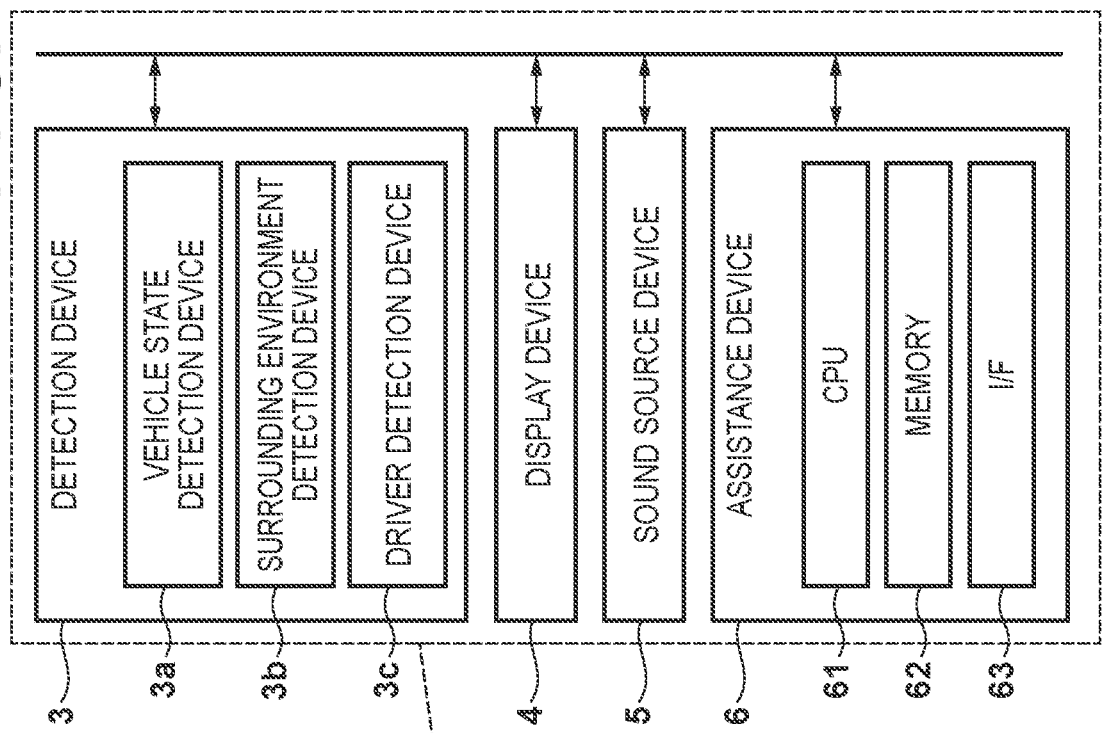
FIG. 1 is a diagram illustrating an example of a configuration of a straddle type vehicle according to an embodiment.
Figure 1:
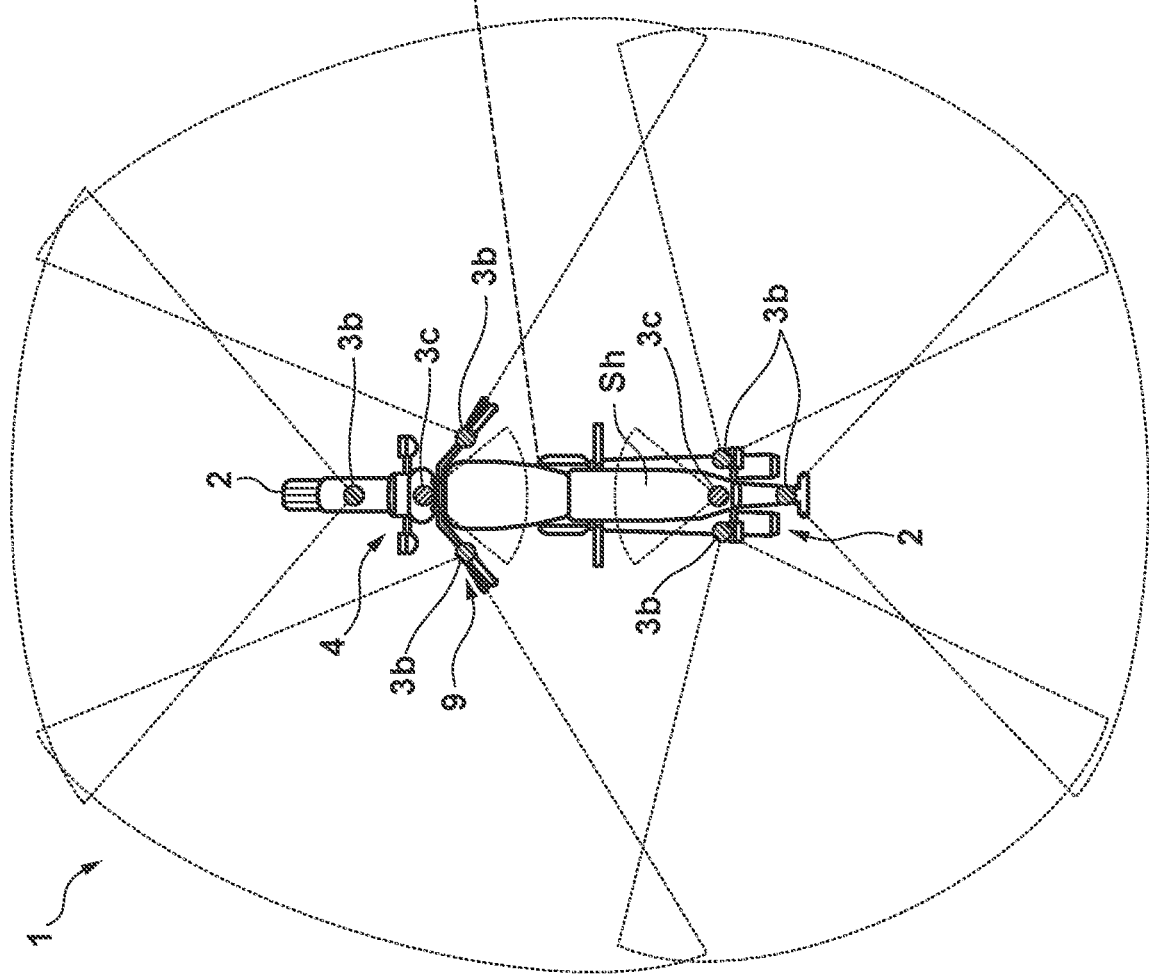

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

FIG. 1 illustrates a configuration example of a straddle type vehicle 1 according to a first embodiment. The straddle type vehicle 1 is a vehicle on which a driver is able to perform a driving operation straddling a vehicle body, and its typical example includes a motorcycle. While the driver does not perform the driving operation, the driver pushes and pulls the straddle type vehicle 1 with its own hands (so-called "handling"). In the following description, this will be simply referred to as "handling"). Generally, the handling is performed in a parking operation.

In the present embodiment, the straddle type vehicle 1 includes wheels 2, a detection device 3, a display device 4, a sound source device 5, and an assistance device 6. In the present embodiment, the straddle type vehicle 1 includes a front wheel and a rear wheel as the wheels 2. However, in another embodiment, the number of front wheels and/or the number of rear wheels may be two or more. The front wheel 2 functions as a steering wheel, and by rotating the handlebar as the steering device 9 with respect to the vehicle body, the driver is able to change the direction of the front wheel 2. Note that the rear wheel 2 functions as a driving wheel, and the dynamic power of a power source is transmitted to the rear wheel 2 via a predetermined power transmission engine.

The detection device 3 is capable of detecting various pieces of information related to the straddle type vehicle 1, and includes a vehicle state detection device 3a, a surrounding environment detection device 3b, and a driver detection device 3c in the present embodiment.

The vehicle state detection device 3a is capable of detecting a state of the straddle type vehicle 1, and is capable of detecting, for example, a vehicle speed, a steering angle, and an inclination of the vehicle body. Note that it is sufficient if known detection sensors are respectively used for detecting them. In the present embodiment, a vehicle speed sensor, a steering angle sensor, and an acceleration sensor are respectively used for detecting the vehicle speed, the steering angle, and the inclination of the vehicle body.

The surrounding environment detection device 3b is capable of detecting an object in surroundings of the straddle type vehicle 1, and is attached to one or more positions of the vehicle body so as to face the outside of the vehicle body. Examples of the object include an object with which physical contact of the straddle type vehicle 1 has to be avoided, for example, an on-road installed object and another vehicle. For the surrounding environment detection device 3b, a device capable of detecting a relative position (a distance, a direction, and the like) of the object with respect to the straddle type vehicle 1 is used. In the present embodiment, a camera is assumed to be used. In another embodiment, a radar (a millimeter wave radar) or a light detection and ranging (LiDAR) may be used for the surrounding environment detection device 3b.

The driver detection device 3c is capable of detecting a state of the driver, and one or more driver detection devices 3c are attached to face a seat Sh on which the driver sits. The driver detection device 3c detects, for example, a state of the driver who is performing a driving operation while traveling, and, at the time of the handling, detects the state of the driver who is performing the handling. For the driver detection device 3c, a camera is assumed to be used in a similar manner to the surrounding environment detection device 3b. However, it is sufficient if a radar, a LiDAR, or the like is used in another embodiment.

The display device 4 is capable of displaying information useful for the driving operation or the driving assistance so that the driver is able to visually recognize the information, and is capable of displaying, for example, a vehicle speed, map data, and the like. Although details will be described later, the display device 4 is also capable of displaying assistance information at the time of the handling. A liquid crystal display may be used for the display device 4, or a touch panel display capable of receiving an operation input of the driver may be used.

The sound source device 5 is capable of notifying the driver of information useful for the driving operation or the driving assistance by sound guidance. It is sufficient if a known speaker is used for the sound source device 5.

The assistance device 6 includes a central processing unit (CPU) 61, a memory 62, and a communication interface 63. As will be described later in detail, when the driver performs the handling, the assistance device 6 provides assistance information that enables performing the handling appropriately, via the display device 4 and/or the sound source device 5. The arithmetic processing for the assistance is performed by the CPU 61 developing and executing a predetermined program on the memory 62. The function of the assistance device 6 can also be implemented by an application specific integrated circuit (ASIC), that is, can be implemented by any of software and software.

Note that all of the above-described devices 3 to 6 are on-vehicle units mountable on the straddle type vehicle 1.

Figure 2:
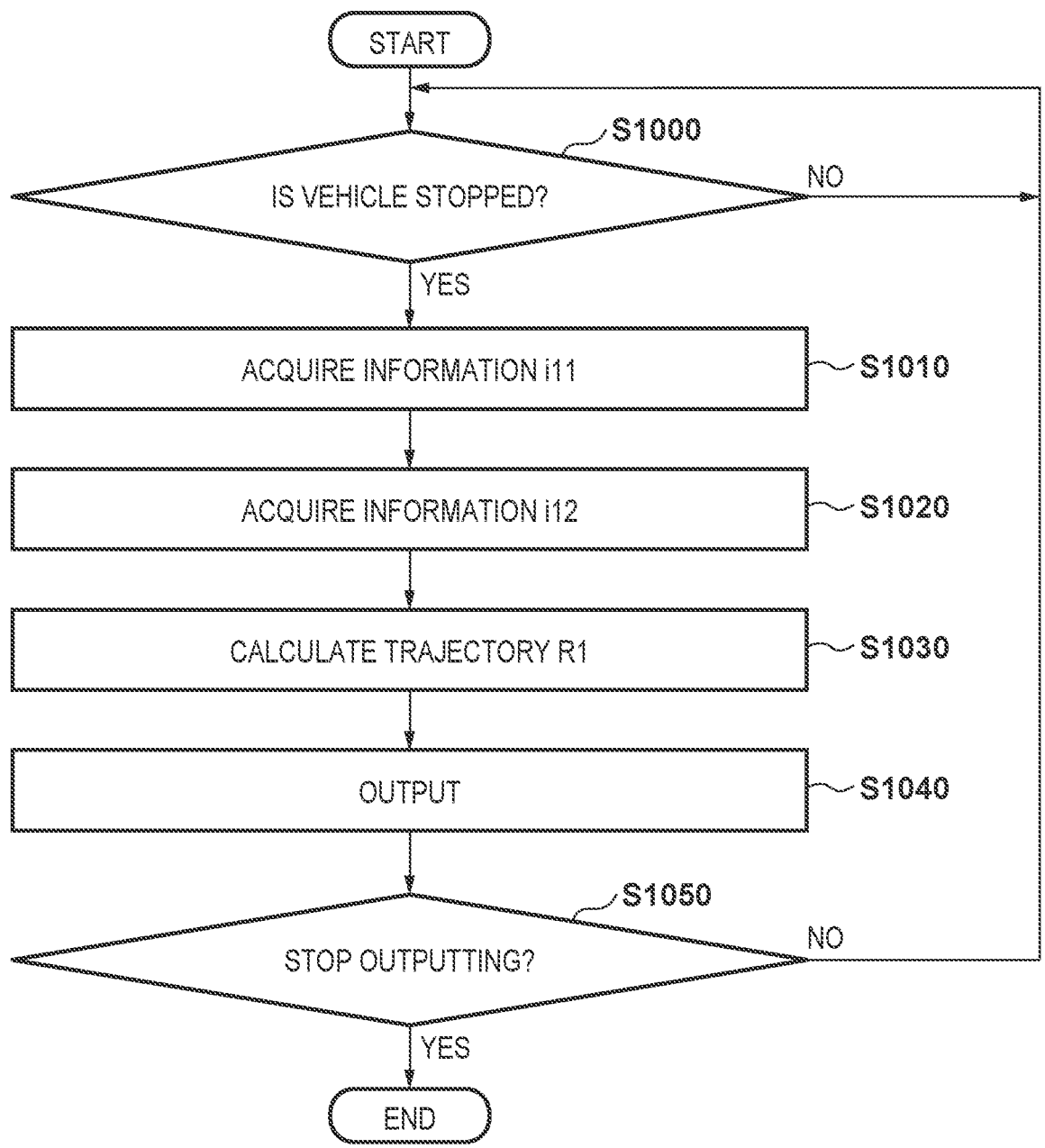
FIG. 2 is a flowchart illustrating an example of contents of arithmetic processing of an assistance device.

FIG. 2 is a flowchart illustrating contents of the arithmetic processing by the assistance device 6. The present flowchart is mainly performed by the CPU 61, and its outline is to calculate a trajectory of the straddle type vehicle 1, based on the steering angle of the straddle type vehicle 1 and the inclination of the vehicle body.

In step S1000 (hereinafter, simply referred to as "S1000". The same will apply to the other steps to be described later), it is determined whether the straddle type vehicle 1 is in a stopped state (whether the power source is in a suspended state). In a case where the straddle type vehicle 1 is in the stopped state, the processing proceeds to S1010, and in the other cases, the processing returns to S1000. That is, the contents of the present flowchart are performed, in the case where the straddle type vehicle 1 is in the stopped state. Note that in S1000, the CPU 61 functions as a determination unit.

In S1010, steering angle information i11 indicating the steering angle of the straddle type vehicle 1 is acquired. It is possible to acquire the steering angle information i11, based on a detection result of the vehicle state detection device 3a of the detection device 3, and the steering angle information i11 indicates, for example, a rotation angle of the handlebar with respect to the vehicle body (or the rotation angle of the front wheel 2). Note that in S1010, the CPU 61 functions as an acquisition unit.

In S1020, inclination angle information i12 indicating an inclination of the vehicle body of the straddle type vehicle 1 is acquired. It is possible to acquire the inclination angle information i12, based on a detection result of the vehicle state detection device 3a of the detection device 3, and the inclination angle information i12 indicates, for example, a posture of the vehicle body with respect to a gravity direction. Note that in S1020, the CPU 61 functions as the acquisition unit.

In S1030, a trajectory R1 of the straddle type vehicle 1 in a case where the driver performs the handling of the straddle type vehicle 1 is calculated, based on the steering angle information it and the inclination angle information i2. For example, in a case where the handlebar is rotated to the left (or right) with respect to the vehicle body, the straddle type vehicle 1 turns to the left (or right) at the time of the handling. In addition, in a case where the vehicle body is inclined to the left (or right) with respect to the gravity direction, the straddle type vehicle 1 turns to the left (or right) at the time of the handling. Therefore, it is possible to calculate a turning radius at the time of the handling, based on the rotation angle (the steering angle) of the handlebar and the inclination of the vehicle body, and it is possible to calculate the trajectory R1 accordingly. Note that in S1030, the CPU 61 functions as a calculation unit.

In S1040, information indicating the trajectory R1 is output to the display device 4. In another embodiment, the information indicating the trajectory R1 may be output to the sound source device 5, that is, may be output to any on-vehicle unit capable of notifying the driver of the information. Note that in S1040, the CPU 61 functions as an output unit, a display unit, and/or a notification unit.

Figure 3:
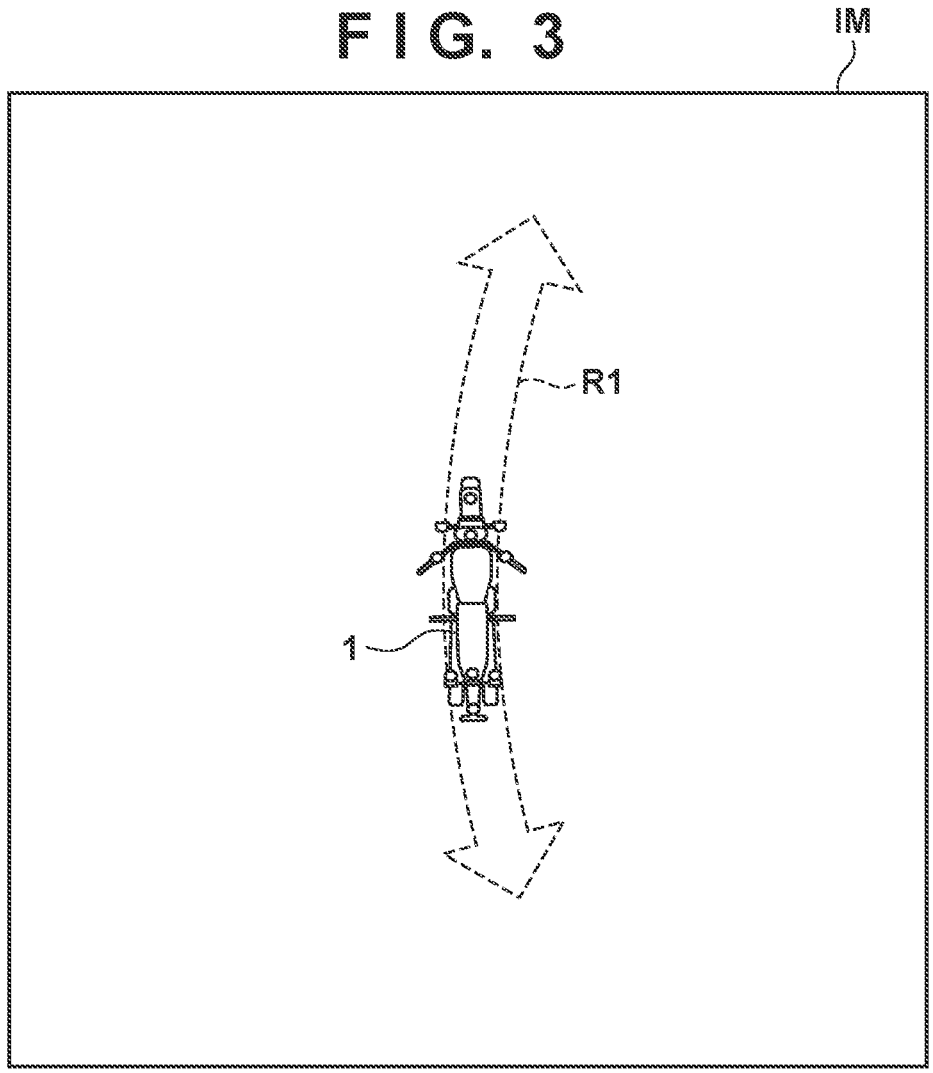
FIG. 3 is a diagram illustrating an example of a display image.

FIG. 3 illustrates an example of an image IM displayed on the display device 4 in S1040. In the display image IM, a route is displayed as the trajectory R1, which is considered to be taken by the straddle type vehicle 1, based on the steering angle and the inclination of the vehicle body in the present situation, when the driver performs the handling.

Note that in the present embodiment, an image in a top view (a viewpoint when viewed directly below from directly above the vehicle body of the straddle type vehicle 1, or in a plan view) is displayed as the display image IM. However, the display image IM may be a perspective view from a predetermined virtual point.

Referring to FIG. 2 again, in S1050, it is determined whether to stop outputting the display image IM. In a case of stopping outputting the display image IM, the present flowchart ends, and in the other cases, the processing returns to S1000. As described above, a touch panel display capable of receiving an operation input of the driver can be used for the display device 4. Therefore, it is sufficient to preform S1050 in response to a predetermined operation input having been made on the touch panel display. Note that in step S1050, the CPU 61 functions as a determination unit.

According to the present embodiment, the assistance device 6 assists the handling. Accordingly, the driver is able to perform appropriate handling while referring to the display device 4. Since the handling is generally performed in the parking operation, it becomes possible to relatively simply perform the parking operation of the straddle type vehicle 1, according to the present embodiment.

Second Embodiment

In general, when the parking operation is performed by the handling, a desired stop position of the straddle type vehicle 1 can be set as a target stop position. Therefore, the assistance device 6 desirably assists the handling so that the straddle type vehicle 1 is guided to the stop position that has been set.

Figure 4:
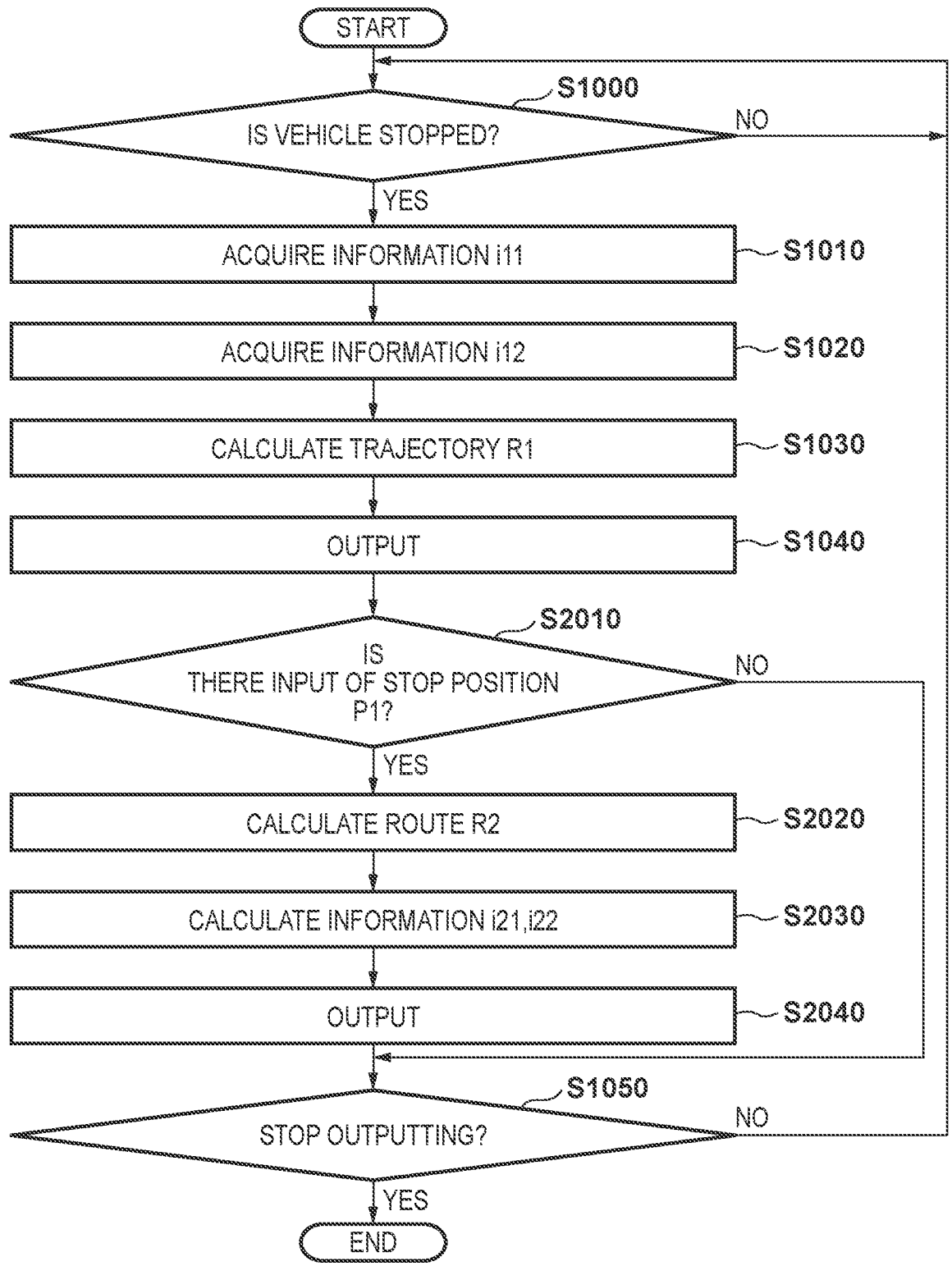
FIG. 4 is a flowchart illustrating another example of the contents of the arithmetic processing of the assistance device.

FIG. 4 illustrates contents of the arithmetic processing of the assistance device 6 according to a second embodiment, in a similar manner to the first embodiment (see FIG. 2). Note that steps S1000 to S1050 in the drawing are similar to those in the first embodiment.

In S2010, it is determined whether the stop position of the straddle type vehicle 1 has been received from an operation input of the driver. In a case where the operation input of the driver has been made, a stop position P1 is set as the target stop position of the straddle type vehicle 1. As described above, a touch panel display capable of receiving an operation input of the driver can be used for the display device 4. Therefore, it is sufficient to set the stop position P1 in response to a predetermined operation input having been made on the touch panel display. In a case where the operation input has been received, the processing proceeds to S2020, and in the other cases, the processing proceeds to S1050. Note that in S2010, the CPU 61 functions as a reception unit and/or a setting unit.

In S2020, a route R2 for guiding the straddle type vehicle 1 to the stop position P1 by the handling is calculated. It is sufficient to perform this calculation, based on the stop position P1 set in S2010 and the current location of the straddle type vehicle 1. Note that in S2020, the CPU 61 functions as the calculation unit.

Here, the detection device 3 is capable of detecting an object in the surroundings of the straddle type vehicle 1 and a relative position of the driver who performs the handling with respect to the straddle type vehicle 1. The surrounding environment detection device 3b is capable of detecting an object in the surroundings of the straddle type vehicle 1. The driver detection device 3c is capable of detecting the relative position of the driver with respect to the straddle type vehicle 1. In a case where the object is detected, it is sufficient if the route R2 is calculated so that the driver does not interfere with the object. For example, in a case where several objects are detected, the route R2 is calculated so that the distance between each detected object and the straddle type vehicle 1 does not become equal to or shorter than a criterion.

In S2030, steering angle information i21 and inclination angle information i22 that enable achieving the route R2 are calculated. As described above (see S1030), it is possible to calculate the turning radius at the time of the handling, based on the rotation angle (the steering angle) of the handlebar and the inclination of the vehicle body, and it is possible to calculate the trajectory R1 accordingly. This applies to the route R2 to be achieved, in other words, it can be said that it is possible to calculate the rotation angle of the handlebar and the inclination of the vehicle body for achieving the route R2. Therefore, it is possible to calculate the steering angle information i21 and the inclination angle information i22, based on the route R2. Note that in S2030, the CPU 61 functions as the calculation unit.

In S2040, information based on the steering angle information i21 and the inclination angle information i22 is output to the display device 4. In the present embodiment, it is assumed that information indicating a difference between pieces of the steering angle information i11 and i21 and a difference between pieces of the inclination angle information i12 and i22 is output, and it is sufficient if this information is displayed on the display device 4 to be superimposed on the information output in S1040 (that is, the trajectory R1). Note that in step S2040, the CPU 61 functions as the output unit, the display unit, and/or the notification unit.

Figure 5:
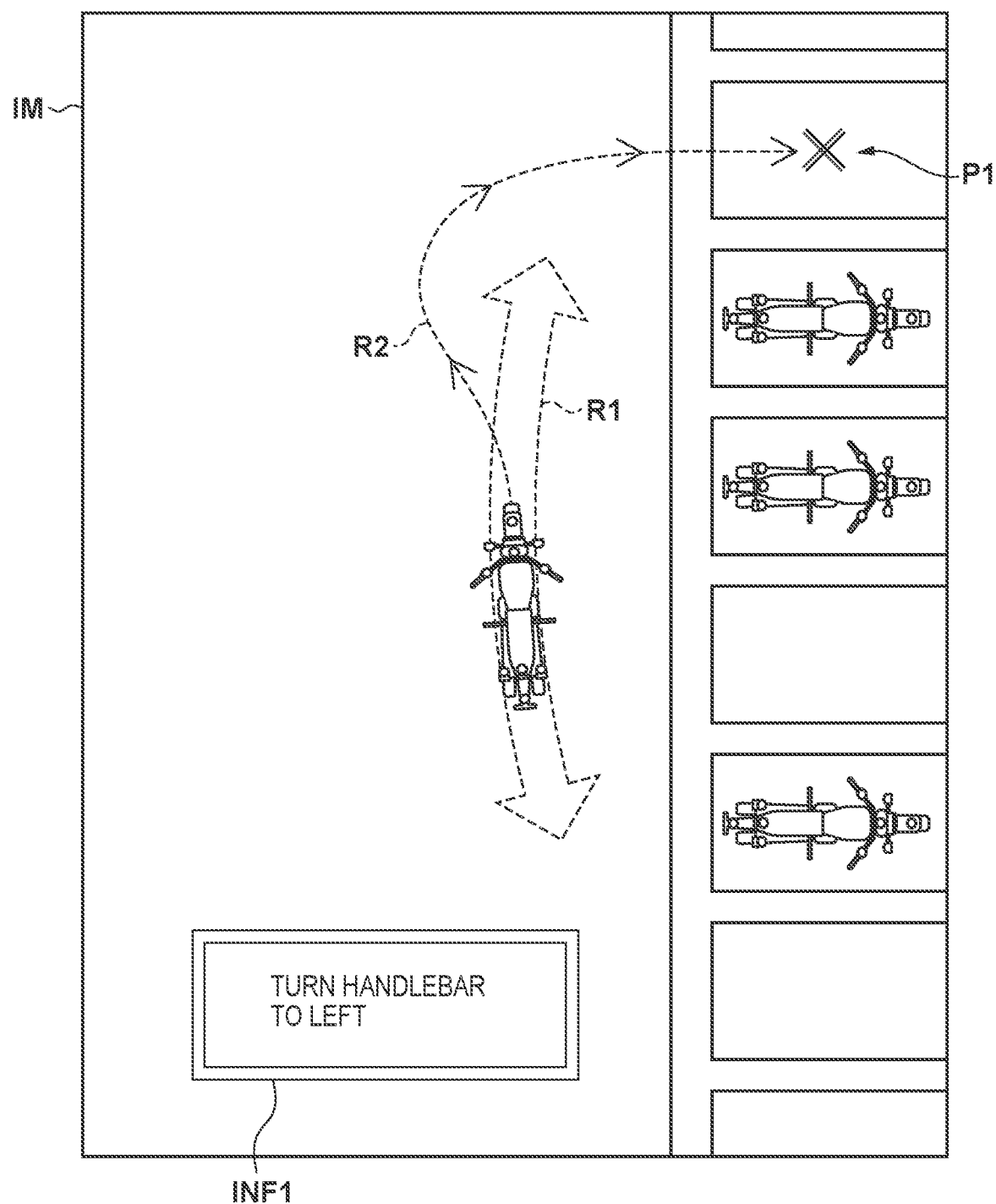
FIG. 5 is a diagram illustrating another example of the display image.

FIG. 5 illustrates an example of the display image IM in the present embodiment. In the image IM, the trajectory R1 is displayed, and guidance INF1 of the rotation angle of the handlebar and the inclination of the vehicle body that enable achieving the route R2 is displayed. For example, the guidance INF1 of increasing the rotation angle of the handlebar, decreasing the rotation angle, or maintaining the rotation angle, and/or increasing the inclination of the vehicle body, decreasing the inclination, or maintaining the inclination can be displayed in the image IM. The route R2 is also desirably displayed in the image IM.

According to the present embodiment, the driver is able to perform the handling in a more appropriate manner, while referring to the display device 4, and is able to appropriately guide the straddle type vehicle 1 to the stop position P1.

Third Embodiment

In the second embodiment described above, the description has been given with regard to the guidance INF1 for the rotation angle of the handlebar and the inclination of the vehicle body that enable achieving the route R2 being displayed in the image IM, as a result of S2040, in the assistance for the handling by the assistance device 6 (see FIGS. 4 to 5).

Generally, the turning radius at the time of the handling is enabled by a combination of the rotation angle of the handlebar and the inclination of the vehicle body. However, information indicating how to determine each of them is preferably prepared. For example, in order achieve a certain turning radius, there are three conceivable cases including a case of enabling achieving it by changing only the rotation angle of the handlebar, a case of enabling achieving it by changing only the inclination of the vehicle body, and a case of enabling achieving it by changing both of them. In addition, in the case of changing both the rotation angle of the handlebar and the inclination of the vehicle body, information for determining which one of the rotation angle of the handlebar and the inclination of the vehicle body should be changed (which operation amount is to be increased) on a priority basis can also be necessary.

Therefore, to achieve a desired turning radius, a reference table indicating how to determine the rotation angle of the handlebar and the inclination of the vehicle body or a calculation model for the determination is desirably prepared.

On the other hand, in a case where a road surface in the surroundings of the straddle type vehicle 1 is a bad road, inclining the vehicle body at the time of the handling may cause the wheels 2 to slide sideways. Therefore, to achieve a desired turning radius, it is generally preferable to rotate the handlebar, instead of inclining the vehicle body. Therefore, a calculation model for calculating the rotation amount of the handlebar corresponding to the degree of inclination of the vehicle body (a calculation model capable of equivalently achieving a similar turning radius) is desirably further prepared, and such conversion processing is desirably performed as necessary.

Note that the above-described bad road indicates any road surface that does not satisfy a condition under which the vehicle is capable of exhibiting the standard traveling performance. Its examples include an unpaved road surface (for example, a gravel road), a road surface having a height difference equal to or more than a criterion (a so-called uneven road surface), and a road surface wetted equal to or more than a criterion (a road surface on which a puddle, snow cover, or the like is present).

Figure 6:
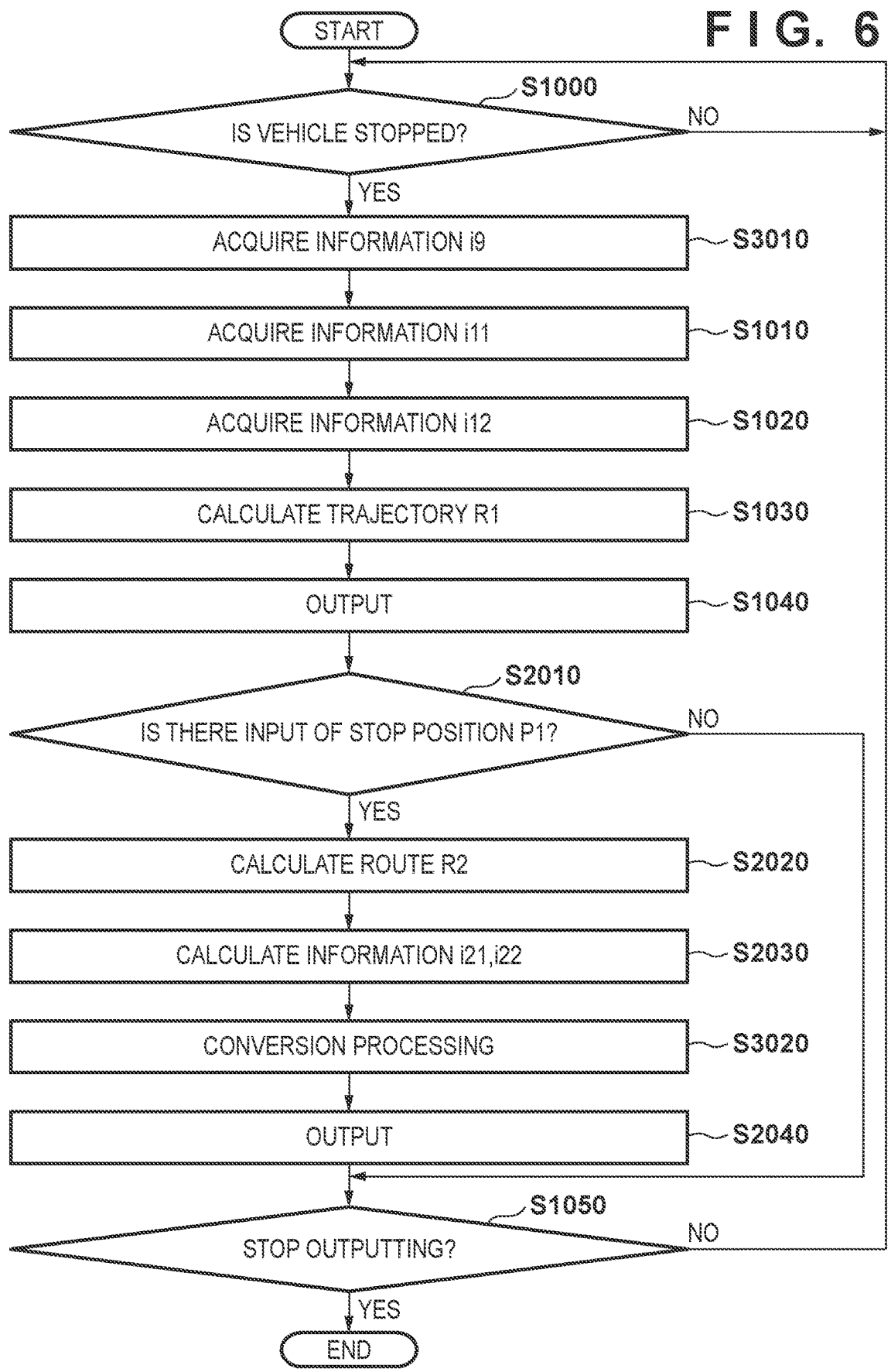
FIG. 6 is a flowchart illustrating another example of the contents of the arithmetic processing of the assistance device.

FIG. 6 illustrates contents of the arithmetic processing of the assistance device 6 according to the third embodiment, in a similar manner to the second embodiment (see FIG. 4). Note that S1000 to S1050 in the drawing are similar to those in the first embodiment, and S2010 to S2040 are similar to those in the second embodiment.

In S3010, road surface environment information (or surrounding environment information) i9 indicating the road surface environment in the surroundings of the straddle type vehicle 1 is further acquired. It becomes possible to evaluate a state of the road surface in the surroundings of the straddle type vehicle 1, based on the road surface environment information i9, and it becomes possible to determine whether the road surface is a bad road. The surrounding environment detection device 3b of the detection device 3 is capable of detecting the road surface environment information i9. In the present embodiment, S3010 is performed before S1010, but it is sufficient to be performed before S2030. Note that in S3010, the CPU 61 functions as the acquisition unit.

As described above (refer to the second embodiment), in S2030, the steering angle information i21 and the inclination angle information i22 that enable achieving the route R2 are calculated.

Then, in S3020, conversion processing of decreasing the inclination of the vehicle body indicated by the steering angle information i21 and increasing the steering angle indicated by the inclination angle information i22 is performed for the inclination angle information i22 and the steering angle information i21 calculated in S2030, based on the road surface environment information i9. That is, the steering angle information i21 and the inclination angle information i22 calculated in S2030 are converted into pieces of information that equivalently enable achieving the route R2 calculated in S2020 and that hardly cause the wheels 2 to slide sideways. From this viewpoint, the conversion and the conversion processing may be respectively rephrased as correction and correction processing.

According to the present embodiment, in a case where the road surface environment information i9 indicates that the road surface in the surroundings of the straddle type vehicle 1 is a bad road, the guidance INF1 of suppressing the inclination of the vehicle body is displayed on the display device 4 in S2040. Accordingly, it becomes possible to prevent the wheels 2 from sliding sideways due to the inclination of the vehicle body while the driver is performing the handling. Therefore, according to the present embodiment, the effects of the second embodiment are obtainable, and in addition, the assistance that equivalently enables achieving a similar turning radius and that enables performing appropriate handling is provided.

Fourth Embodiment

In general, in a case where the road surface to be the stop position P1 of the straddle type vehicle 1 slopes (is not horizontal), the straddle type vehicle 1 can be demanded to stop so that the front side of the vehicle body is higher than the rear side of the vehicle body. In such a case, the route R2 calculated in S2020 is desirably set so that the front side of the vehicle body is higher than the rear side of the vehicle body, when the straddle type vehicle 1 stops at the stop position P1.

Figure 7:
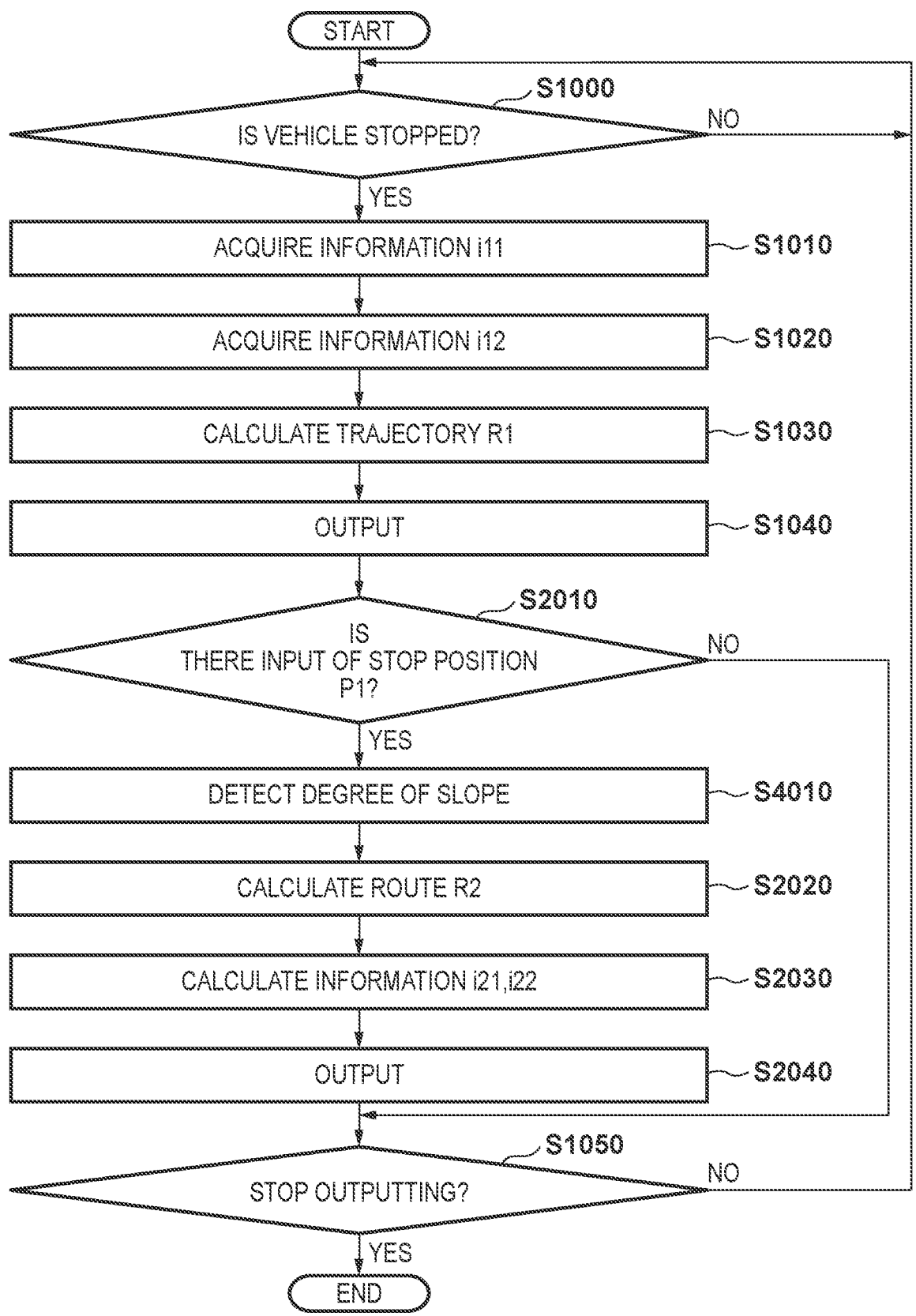
FIG. 7 is a flowchart illustrating another example of the contents of the arithmetic processing of the assistance device.

FIG. 7 illustrates contents of the arithmetic processing of the assistance device 6 according to the fourth embodiment, in a similar manner to the second embodiment (see FIG. 4). Note that S1000 to S1050 in the drawing are similar to those in the first embodiment, and S2010 to S2040 are similar to those in the second embodiment.

In S4010, the degree of the slope of the road surface to be the stop position P1 is detected. The detection device 3 is capable of detecting the degree of the slope of the road surface to be the stop position P1, and is typically capable of detecting it, based on detection results of both the vehicle state detection device 3a (for example, an acceleration sensor) and the surrounding environment detection device 3b.

In a case where the degree of the slope satisfies a criterion, the route R2 is desirably calculated in S2020 so that the front side of the vehicle body is higher than the rear side of the vehicle body, when the straddle type vehicle 1 stops at the stop position P1. Examples of the case where the degree of the slope satisfies the criterion include a case where the inclination in the front-and-rear direction of the vehicle body of the straddle type vehicle 1, which stops at the stop position P1, is equal to or larger than 20 degrees.

Figure 8:
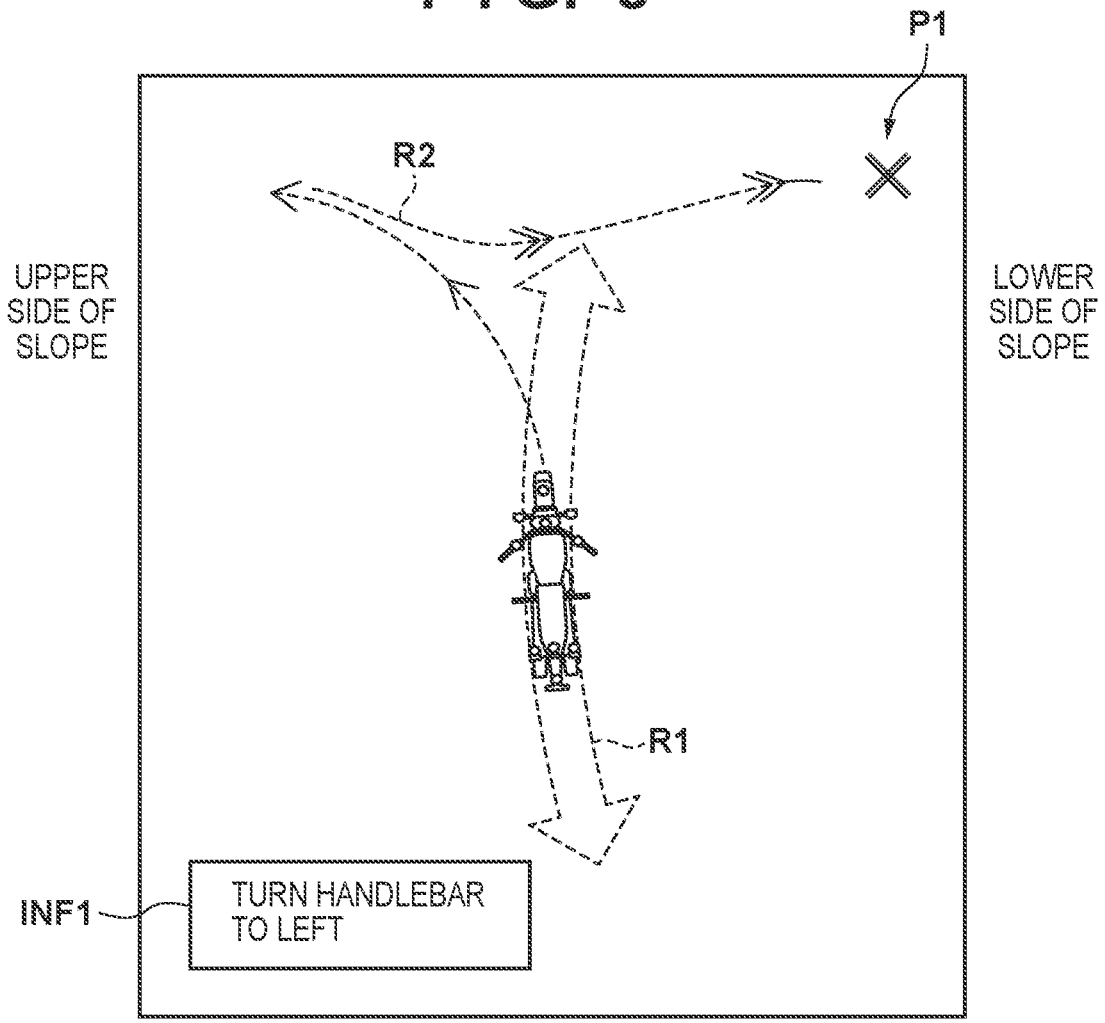
FIG. 8 is a diagram illustrating another example of the display image.

FIG. 8 illustrates an example of the display image IM in the present embodiment. Here, it is assumed that the road surface at the stop position P1 slopes such that the left side in the image IM is higher and the right side in the image IM is lower (the left side in the image IM is an upper side of a slope and the right side in the image IM is a lower side of the slope). In the present embodiment, the route R2 and the guidance INF1 are displayed in the image IM so that the driver is able to visually recognize them. According to the present embodiment, the assistance that enables performing more appropriate handling is provided.

Note that in the present example, the straddle type vehicle 1 is caused to get closer to the stop position P1 from the rear side of the vehicle body. Therefore, as illustrated in FIG. 8, an arrow indicating a forward movement and an arrow indicating a rearward movement in the route R2 are desirably displayed to be different in type from each other.

Fifth Embodiment

Figure 9:
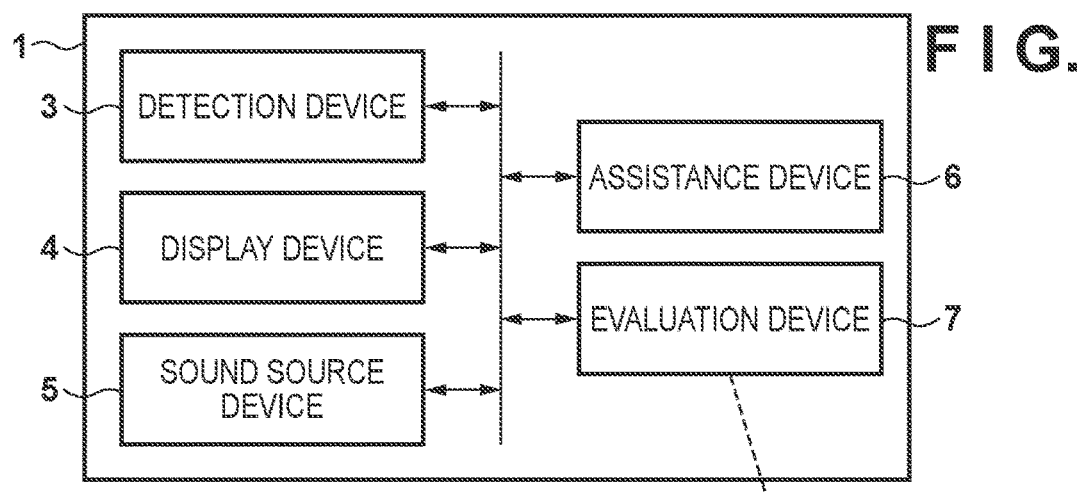
FIG. 9 is a diagram illustrating another example of the configuration of the straddle type vehicle.
Figure 9:
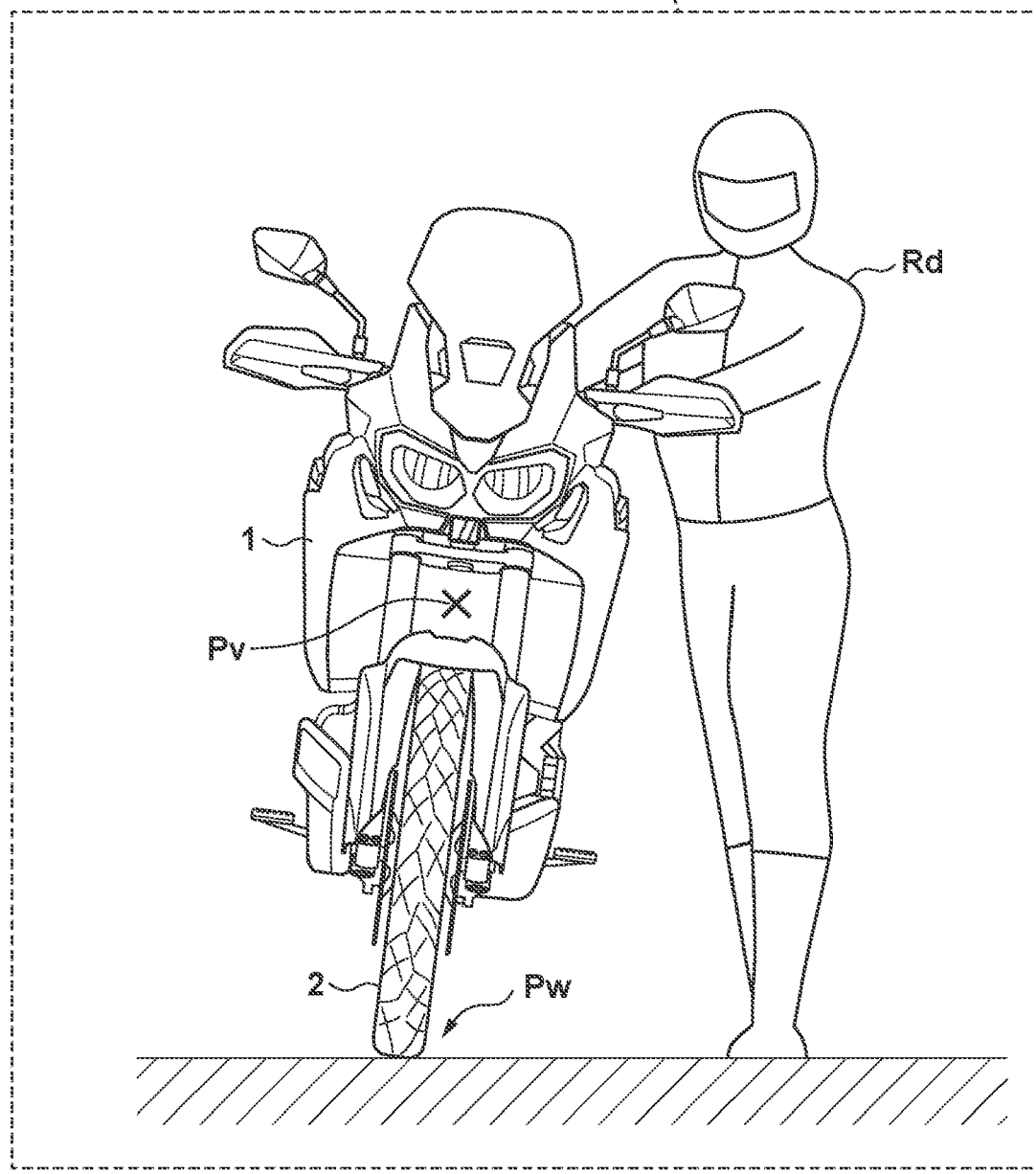

FIG. 9 illustrates a configuration example of the straddle type vehicle 1 according to a fifth embodiment. The straddle type vehicle 1 further includes an evaluation device 7. The evaluation device 7 is capable of evaluating a possibility that the straddle type vehicle 1 falls over, based on a detection result of the detection device 3.

For example, in a case where a gravity center position $P_V$ of the straddle type vehicle 1 is located between the wheel 2 (a contact point $P_W$ of the wheel 2 on the road surface) and a driver Rd in the horizontal direction, it is relatively easy to prevent the straddle type vehicle 1 from falling over. On the other hand, in a case where the gravity center position $P_V$ is located on an opposite side to the driver Rd with respect to the wheel 2, it is relatively difficult to prevent the straddle type vehicle 1 from falling over. Therefore, the evaluation device 7 is capable of evaluating the possibility that the straddle type vehicle 1 falls over, based on a state of the driver who performs the handling and a state of the straddle type vehicle 1.

The driver detection device 3c is capable of detecting the state of the driver that performs the handling, and the vehicle state detection device 3a and/or the driver detection device 3c are/is capable of detecting the state of the straddle type vehicle 1. Similarly to the assistance device 6, the function of the evaluation device 7 can be implemented by any of hardware and software.

When the evaluation device 7 evaluates that there is a possibility that the straddle type vehicle 1 falls over, the assistance device 6 desirably gives a notification to the driver Rd. This notification may be given by being displayed on the display device 4, or may be given by warning sounds or sound guidance by the sound source device 5. According to the present embodiment, the assistance that enables performing more appropriate handling is provided.

(Modifications)

There is a conceivable case where it is difficult for the driver to perform the handling while paying attention to both the rotation angle of the handlebar and the inclination of the vehicle body (while simultaneously adjusting both of them). Therefore, the assistance device 6 may display, on the display device 4, only the inclination angle information i12, which enables achieving the route R2, based on the steering angle information i21, which is periodically acquired and updated. In this case, in the display image IM, the guidance INF1 indicating how to adjust the rotation angle of the handlebar is periodically updated. When the driver inclines the vehicle body, the guidance INF1 is updated in response to this. According to this example, the driver is able to perform the handling while paying attention only to the rotation angle of the handlebar. Note that it is sufficient if the update period is, for example, several tens to several hundreds of milliseconds (msec).

In the descriptions heretofore, in order to facilitate the understanding, each element has been indicated with a name related to its functional aspect. However, each element is not limited to an element including a content that has been described in the embodiments as its main function, and may include the content as a supplementary function. Thus, each element may be replaced with a similar expression without being limited by its expression. For the same purpose, the expression "apparatus" may be replaced with "unit", "part (component, piece)", "member", "structure", "assembly" or the like, or may be omitted.

Summary of Embodiments

Some characteristics of the embodiments are as follows:

The first aspect is related to an assistance device (6) that assists an operation of a straddle type vehicle (1), the assistance device comprising:

an acquisition unit (S1010-S1020) configured to acquire steering angle information (i11) indicating a steering angle of the straddle type vehicle and inclination angle information (i12) indicating an inclination of a vehicle body of the straddle type vehicle;

a calculation unit (S1030) configured to calculate a trajectory of the straddle type vehicle, in a case of performing handling (the driver's pushing and pulling the vehicle with his/her own hands) the straddle type vehicle, based on the steering angle information and the inclination angle information; and a output unit (S1040) configured to output information indicating the trajectory.

Accordingly, the driver is able to perform the handling of the straddle type vehicle, based on the above information output to an on-vehicle unit such as the display device, and is able to appropriately perform the parking operation of the straddle type vehicle.

In the second aspect, the steering angle information is set as first steering angle information (i11), and the inclination angle information is set as first inclination angle information (i12), the assistance device further comprising a reception unit (S2010) configured to receive, from an operation input, a stop position (P1) of the straddle type vehicle, wherein the calculation unit calculates second steering angle information (i21) and second inclination angle information (i22) for the straddle type vehicle to reach the stop position by the handling.

Accordingly, the driver is able to appropriately guide the straddle type vehicle to the stop position by the handling.

In the third aspect, the output unit further outputs information based on the second steering angle information and the second inclination angle information.

Accordingly, the driver is able to appropriately perform the handling.

In the fourth aspect, the output unit outputs information indicating a difference between the first steering angle information and the second steering angle information and a difference between the first inclination angle information and the second inclination angle information.

Accordingly, the driver is able to appropriately perform the handling.

In the fifth aspect, the acquisition unit further acquires road surface environment information (i9) indicating a road surface environment, and in a case where the road surface environment information satisfies a predetermined condition, the calculation unit performs conversion processing on the second steering angle information and the second inclination angle information to decrease the inclination of the vehicle body indicated by the second inclination angle information and to increase the steering angle indicated by the second steering angle information.

Accordingly, the driver is able to perform the handling in a more appropriate manner.

In the sixth aspect, the case where the road surface environment information satisfies the predetermined condition includes a case where a road surface in surroundings of the straddle type vehicle is unpaved, a case where the road surface has a height difference equal to or more than a criterion, and/or a case where the road surface is wet equal to or more than a criterion.

Accordingly, the driver is able to perform the handling in a more appropriate manner.

The seventh aspect is related to a straddle type vehicle (1) comprising: the above-mentioned assistance device (6); and wheels (2).

That is, the above-described assistance device is applicable to a typical straddle type vehicle.

In the eighth aspect, the straddle type vehicle further comprises a display device (4) as an on-vehicle unit to which the output unit outputs the information indicating the trajectory.

Accordingly, the assistance by the assistance device is displayed in a visible manner.

In the ninth aspect, the straddle type vehicle further comprises a sound source device (5) as an on-vehicle unit to which the output unit outputs the information indicating the trajectory.

Accordingly, the assistance by the assistance device can be performed by, for example, sound guidance.

In the tenth aspect, the straddle type vehicle further comprises: a detection device (3); and an evaluation device (7), wherein the detection device detects a state of a driver who performs the handling and a state of the straddle type vehicle, and the evaluation device evaluates a possibility that the straddle type vehicle falls over, based on a detection result of the detection device.

Accordingly, the driver is able to perform the handling in a more appropriate manner.

The eleventh aspect is related to a straddle type vehicle (1) comprising: the above-mentioned assistance device (6); wheels (2); and a detection device (3), wherein the detection device detects an object in surroundings of the straddle type vehicle, and detects a relative position of a driver who performs the handling with respect to the straddle type vehicle, and when the object is detected, the calculation unit calculates a route (R2) for guiding the straddle type vehicle to the stop position by the handling, the route being not causing the driver to interfere with the object, and calculates the second steering angle information and the second inclination angle information that enable achieving the route.

Accordingly, the driver is able to perform the handling in a more appropriate manner.

The twelfth aspect is related to a straddle type vehicle (1) comprising: the above-mentioned assistance device (6); wheels (2); and a detection device (3), wherein the detection device detects a degree of a slope of a road surface to be the stop position, and in a case where the degree of the slope satisfies a criterion, the calculation unit calculates a route (R2) for guiding the straddle type vehicle to the stop position by the handling, the route making a front side of the vehicle body higher than a rear side of the vehicle body, when the straddle type vehicle stops at the stop position, and calculates the second steering angle information and the second inclination angle information that enable achieving the route.

Accordingly, it becomes possible to appropriately stop the straddle type vehicle at the stop position also on a sloped road surface.

The present invention is not limited to the above embodiments, and various changes and modifications can be made without departing from the spirit and scope of the present invention. Therefore, in order to make the scope of the present invention public, the following claims are attached.

REFERENCE SIGNS LIST

1 Straddle type vehicle
6 Assistance device
i11 and i21 Steering angle information
i12 and i22 Inclination angle information

The invention claimed is:

1. An assistance device that assists an operation of a straddle type vehicle, the assistance device comprising:
an acquisition unit configured to acquire steering angle information indicating a steering angle of the straddle type vehicle and inclination angle information indicating an inclination of a vehicle body of the straddle type vehicle;
a calculation unit configured to calculate a trajectory of the straddle type vehicle, in a case of performing handling the straddle type vehicle, based on the steering angle information and the inclination angle information;
an output unit configured to output information indicating the trajectory; and
a reception unit configured to receive, from an operation input, a stop position of the straddle type vehicle, wherein
the steering angle information is set as first steering angle information, and the inclination angle information is set as first inclination angle information, and
the calculation unit calculates second steering angle information and second inclination angle information for the straddle type vehicle to reach the stop position by the handling.

2. The assistance device according to claim 1, wherein the output unit further outputs information based on the second steering angle information and the second inclination angle information.

3. The assistance device according to claim 2, wherein the output unit outputs information indicating a difference between the first steering angle information and the second steering angle information and a difference between the first inclination angle information and the second inclination angle information.

4. The assistance device according to claim 1, wherein
the acquisition unit further acquires road surface environment information indicating a road surface environment, and
in a case where the road surface environment information satisfies a predetermined condition, the calculation unit performs conversion processing on the second steering angle information and the second inclination angle information to decrease the inclination of the vehicle body indicated by the second inclination angle information and to increase the steering angle indicated by the second steering angle information.

5. The assistance device according to claim 4, wherein the case where the road surface environment information satisfies the predetermined condition includes a case where a road surface in surroundings of the straddle type vehicle is unpaved, a case where the road surface has a height difference equal to or more than a criterion, and/or a case where the road surface is wet equal to or more than a criterion.

6. A straddle type vehicle comprising:
   a plurality of wheels; and
   an assistance device that assists an operation of the straddle type vehicle, wherein the assistance device comprises:
      an acquisition unit configured to acquire steering angle information indicating a steering angle of the straddle type vehicle and inclination angle information indicating an inclination of a vehicle body of the straddle type vehicle;
      a calculation unit configured to calculate a trajectory of the straddle type vehicle, in a case of performing handling the straddle type vehicle, based on the steering angle information and the inclination angle information;
      an output unit configured to output information indicating the trajectory; and
      a reception unit configured to receive, from an operation input, a stop position of the straddle type vehicle,
      the steering angle information is set as first steering angle information, and the inclination angle information is set as first inclination angle information, and
      the calculation unit calculates second steering angle information and second inclination angle information for the straddle type vehicle to reach the stop position by the handling.

7. The straddle type vehicle according to claim 6, further comprising a display device as an on-vehicle unit to which the output unit outputs the information indicating the trajectory.

8. The straddle type vehicle according to claim 6, further comprising a sound source device as an on-vehicle unit to which the output unit outputs the information indicating the trajectory.

9. The straddle type vehicle according to claim 6, further comprising:
   a detection device; and an evaluation device, wherein
   the detection device detects a state of a driver who performs the handling and a state of the straddle type vehicle, and the evaluation device evaluates a possibility that the straddle type vehicle falls over, based on a detection result of the detection device.

10. The straddle type vehicle according to claim 6, wherein
    a detection device detects an object in surroundings of the straddle type vehicle, and detects a relative position of a driver who performs the handling with respect to the straddle type vehicle, and
    when the object is detected, the calculation unit calculates a route for guiding the straddle type vehicle to the stop position by the handling, the route being not causing the driver to interfere with the object, and calculates the second steering angle information and the second inclination angle information that enable achieving the route.

11. The straddle type vehicle according to claim 6, wherein
    a detection device detects a degree of a slope of a road surface to be the stop position, and
    in a case where the degree of the slope satisfies a criterion, the calculation unit calculates a route for guiding the straddle type vehicle to the stop position by the handling, the route making a front side of the vehicle body higher than a rear side of the vehicle body, when the straddle type vehicle stops at the stop position, and calculates the second steering angle information and the second inclination angle information that enable achieving the route.

\* \* \* \* \*